United States Patent [19]

Leiber et al.

[11] 4,085,979

[45] Apr. 25, 1978

[54] TESTING ARRANGEMENT FOR ANTILOCKING CONTROL SYSTEM WITH TWO IDENTICAL ANTILOCKING CONTROL UNITS

[75] Inventors: Heinz Leiber, Leimen; Jürgen Gerstenmeier, Ngm-Waldhilsbach; Hermann Klotz, Schwetzingen, all of Germany

[73] Assignee: Teldix GmbH, Heidelberg, Germany

[21] Appl. No.: 783,734

[22] Filed: Apr. 1, 1977

[30] Foreign Application Priority Data

Apr. 1, 1976 Germany .......................... 2614016

[51] Int. Cl.² .............................................. B60T 8/00

[52] U.S. Cl. .................................... 303/92; 340/52 B

[58] Field of Search ..................... 91/363 A; 244/194; 235/153 R, 153 A; 303/92, 96, 106; 307/219; 318/564; 324/73 R, 73 AT; 340/52 B, 53, 146.1 BE, 214, 410, 411

[56] References Cited

U.S. PATENT DOCUMENTS 3,680,069 7/1972 Neumann et al. ............... 340/411 X
3,740,103 6/1973 Sweet et al. ....................... 303/92 X
3,744,851 7/1973 Burckhardt et al. ................ 303/106
3,803,425 4/1974 Carp .................................... 307/219
3,907,380 9/1975 Fleischer et al. ...................... 303/92

*Primary Examiner*—Stephen G. Kunin
*Attorney, Agent, or Firm*—Spencer & Kaye

[57] ABSTRACT

An antilocking control system for the wheel brakes of a vehicle, which system includes two identically designed control units for various wheels of the vehicle and with each control unit comprising at least one wheel speed sensor, an evaluation circuit for evaluating the output signals from the sensors and for producing control signals and a brake pressure control unit responsive to the control signals from the evaluation circuit, as well as a device for testing the operability of the antilocking control system at desired time intervals. The testing device, upon receipt of a start instruction, simultaneously feeds at least one identical test signal to each of the two control units, and then compares the effect of the test signal on the two control units by comparing output signals from the two control units at given corresponding points in the two control units for at least approximate coincidence with respect to the timely occurrence and/or the magnitude of the signals and generates a control signal, e.g., to switch-off the antilock control system and/or actuate a warning device, if there is a deviation between the two signals being compared which is greater than a given value.

10 Claims, 4 Drawing Figures t [ms]
v[km/h]
$V_1$
$V_2$
$V_R$
$V_{Ref}$
-b
$+b_1$
$+b_2$
$\lambda_1$
$\lambda_2$
EV
AV
TM
$t_1$
$t_2$
$t_3$
$t_4$
$t_5$
$t_6$
$t_7$
$\Delta t$
$T_2$
100
200
300
400
500
600

TESTING ARRANGEMENT FOR ANTILOCKING CONTROL SYSTEM WITH TWO IDENTICAL ANTILOCKING CONTROL UNITS

BACKGROUND OF THE INVENTION

The present invention relates to an antilocking control system for the wheel brakes of a vehicle. More particularly the present invention relates to such an antilocking control system which includes two identically designed control units each having at least one wheel speed sensor, an evaluation circuit and a brake pressure control unit, for different wheels of the vehicle, as well as a device for testing the operability of the antilocking control system at certain desired time intervals.

A device for checking an antilocking control system for the wheel brakes of a vehicle is known, for example, from German Offenlegungsschrift (Laid Open Patent Application) No. 2,323,358, corresponding to U.S. Pat. No. 3,907,380 issued Sept. 23rd, 1975, to Helmut Fleischer et al. According to the teaching of that patent, a signal corresponding to a given wheel velocity curve is applied to a test input of the control system when, for example, the vehicle is started, and a determination is made whether certain events will occur at given time intervals in view of this known test signal.

SUMMARY OF THE INVENTION

It is the object of the present invention to simplify, the testing of the proper operation of an antilocking control system which includes two identical antilocking control units.

This is accomplished according to the present invention in that in an antilocking control system for the wheel brakes of a vehicle including two identically designed control units and a testing means for testing the operability of the control system; the testing means includes switching means, responsive to a start instruction for simultaneously feeding at least one identical test signal to each of the two control units, and interrogation and testing means for comparing the effect of the test signal on the two control units by comparing output signals at given corresponding locations in the two control units for coincidence with respect to the timely occurrence and/or magnitude of the signals and for emitting a control signal, e.g. to switch-off the antilock control system and/or actuate a warning device if any deviation between the two signals being compared exceeds a given value.

The present invention is based on the assumption that there is a great probability that the same error will not occur simultaneously in both units between two testing moments which lie relatively closely together in time.

The present invention eliminates the provision of testing means to determine, upon receipt of a test signal, whether certain events will occur at certain points in time. In contradistinction thereto, in the present invention it is only necessary to determine whether changes in the signal occur at the same moment in both control units at corresponding locations. This type of test can be effected much more easily.

If the antilocking control system employs threshold circuits in both units for the wheel deceleration, the wheel acceleration and/or the wheel slip, the test signal fed to both units is dimensioned so that output signals will appear at the outputs of the individual threshold circuits of each control unit in succession. In this case the sensing and testing means are connected with the desired outputs of the signal generators and the coincidence of the occurrence of corresponding signals can be monitored. The simultaneous occurrence of control signals for corresponding valves of the pressure control device can also be monitored in this way.

In order to generate the above-mentioned signals, the test signal fed to the two control units is provided with at least one section or portion which corresponds to a constant wheel velocity, at least one section or portion which corresponds to a drop in wheel velocity, and at least one section or portion which corresponds to an increase in wheel velocity.

According to a particularly preferred embodiment of the present invention, the signals from the control units to be controlled, which signals have been generated in different signal lines, are linked by means of a logic circuit so that a signal sequence of logic O and L signals is produced. The linkage must be selected so that the signal sequence is characteristic for the creation and/or disappearance of the signals to be tested in the various lines. For this purpose it is only necessary to compare the signal sequences generated by the two control units.

When at least one inlet valve and one outlet valve are controlled and if components are available for generating a signal when a given wheel deceleration and wheel slip are exceeded per control unit, the two valves can be linked together via an EXCLUSIVE-OR gate, the deceleration signal and the slip signal can be linked by means of an AND gate and the output signals from these two gates can be linked by means of an EXCLUSIVE-OR gate.

If a monitoring circuit is additionally used in the anti-locking control system so that the control system is switched off if circuit members respond for too long a period of time, switching means may additionally be provided which generate signals for triggering the time members provided for the monitoring. The testing means here monitor the occurrence of signals at the end of the time constants. Here, too, it may be tested whether corresponding signals are present simultaneously if the two control units have separate monitoring circuits. If the time members are of the digital type, e.g., counters, they are charged with or fed a sequence of actuating pulses at a much higher frequency than that which occurs during the regulating process so that the testing operation can be accelerated.

In the case where two wheels, e.g., a front wheel and a rear wheel, have their brake pressure regulated by each one of the two control units and where a signal identifying the behavior of the wheel is derived from both wheels and processed into control signals for the associated wheel, the expenditures for the testing operation can be reduced in that a signal is produced in both control units from corresponding signals, e.g., from the two deceleration signals, in that the signals are alternatingly scanned at a rapid rhythm and the scanned signals are combined. Since this again occurs identically in both control units, it is still possible to compare the corresponding signals.

DETAILED DESCRIPTION OF THE PREFERRED EMBODIMENTS

Figures 1, 3:
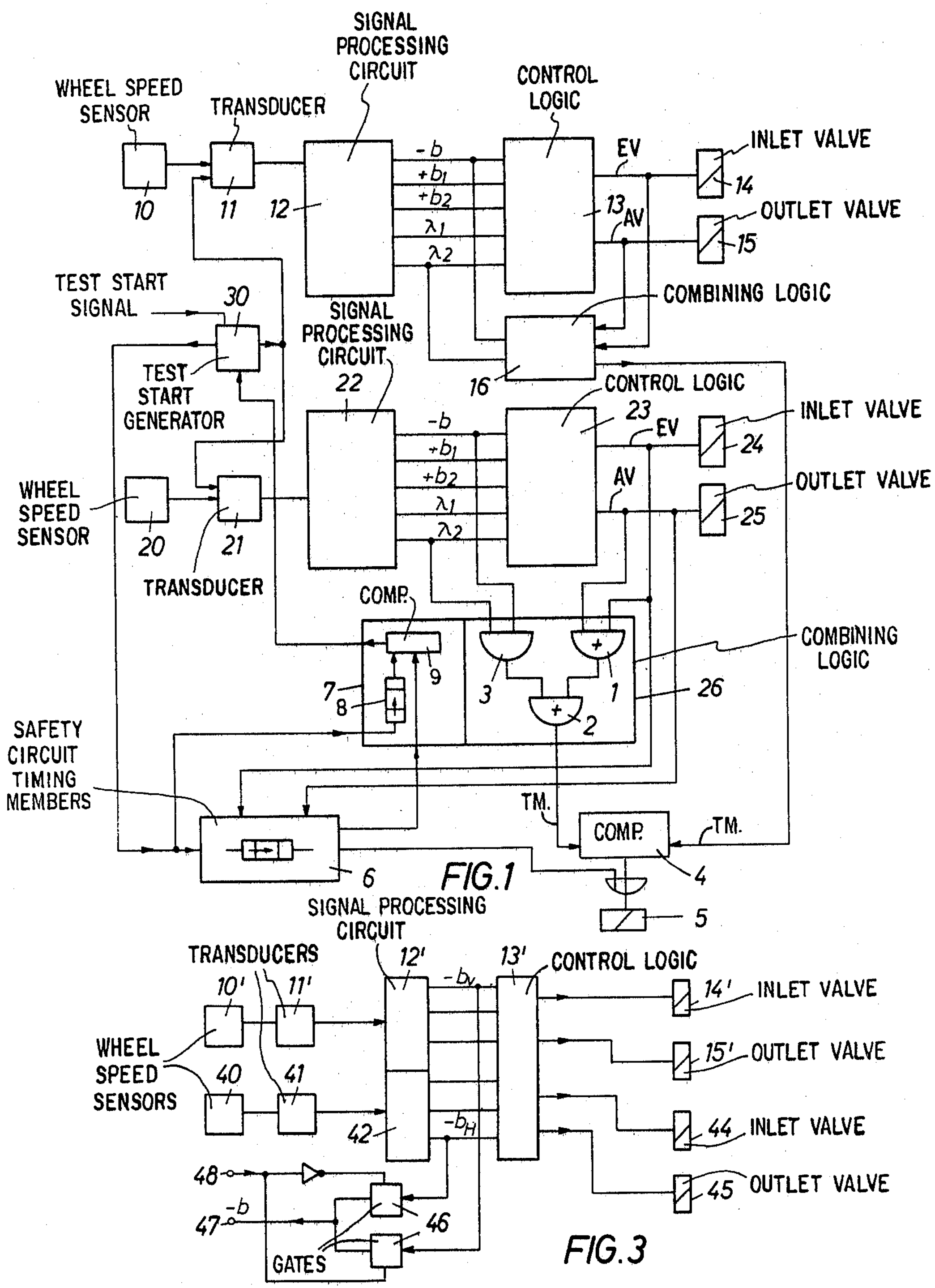
FIG. 1 is a block circuit diagram of one embodiment of an antilocking control system with a testing arrangement according to the invention.
FIG. 3 is a block circuit diagram showing a modification of the embodiment of the invention shown in FIG. 1 whereby the invention can be utilized with antilock control systems having two sensors per control unit.

Referring now to FIG. 1 there is shown an antilocking control system for a vehicle which includes two substantially identically designed control units each comprising a wheel speed sensor 10 or 20, respectively, a transducer 11 or 21, respectively, a signal evaluation control circuit including a signal processing unit 12 or 22, respectively, and a control logic unit 13 or 23, respectively, and a pressure control unit including an inlet valve 14 or 24, respectively, and an outlet valve 15 or 25, respectively. In the described embodiment, it is assumed that the units are of digital design, i.e., a digital signal corresponding to the speed of the wheel, as sensed by the sensor 10 or 20, is generated in transducer 11 or 21, respectively and is fed to signal processing unit 12 or 22, respectively. In the signal processing units 12 and 22 signals are generated on respective output lines whenever a certain wheel deceleration threshold value $-b$, certain wheel acceleration threshold values $+b_1$ and $+b_2$, and different slip threshold values $+\lambda_1$ and $\lambda_2$ are exceeded. These generated signals are fed to the logic circuits 13 and 23, respectively, wherein they are processed into actuating signals for valves 14, 15 or 24, 25, respectively. Such vehicle wheel antilock systems are well known in the art, for example from U.S. Pat. No. 3,754,797 issued Aug. 28th, 1973 to Rodi et al. taken in combination with U.S. Pat. No. 3,976,860 issued Aug. 24, 1976 to Gerstenmeier et al.

To test the system, a signal generator 30 is provided which at desired times for example, in response to a signal from the ignition switch at every start of the vehicle feeds a test signal to both transducers 11 and 21. It must be assured in this connection that the corresponding groups of the two control units 10–15 and 20–25 have the same starting position. The test signal produced by generator 30 is dimensioned so that signals corresponding to all functions to be tested are generated one after the other so that it can be determined whether corresponding signals are generated simultaneously in the two control units.

In the embodiment of FIG. 1 it is assumed that at the beginning of the test procedure the digital memory in each of the processing units 12 or 22 which stores the wheel velocity is set to a position corresponding to a high wheel velocity $v_1$ but that the reference value required for the slip formation is set to 0, and that transducers 11 and 21 are initially fed a test signal with a frequency which corresponds to a speed $v_2$ which is slower than $v_1$. Since the signals processed in the transducers and in the signal processor, which signals correspond to the speed of the wheel $V_R$ and to the reference speed $V_{Ref}$, are generated through a filter (this means that these values can adapt themselves to the momentary wheel speed only within given steps), signal sequences are produced (the digital pattern is not shown) which correspond to the sequence of the wheel speed $V_R$ or the reference speed $V_{Ref}$ shown in the left portion of FIG. 2 up to about 300 msec. The sequences shown in FIG. 2 apply to both control units in the same way.

Figure 2:
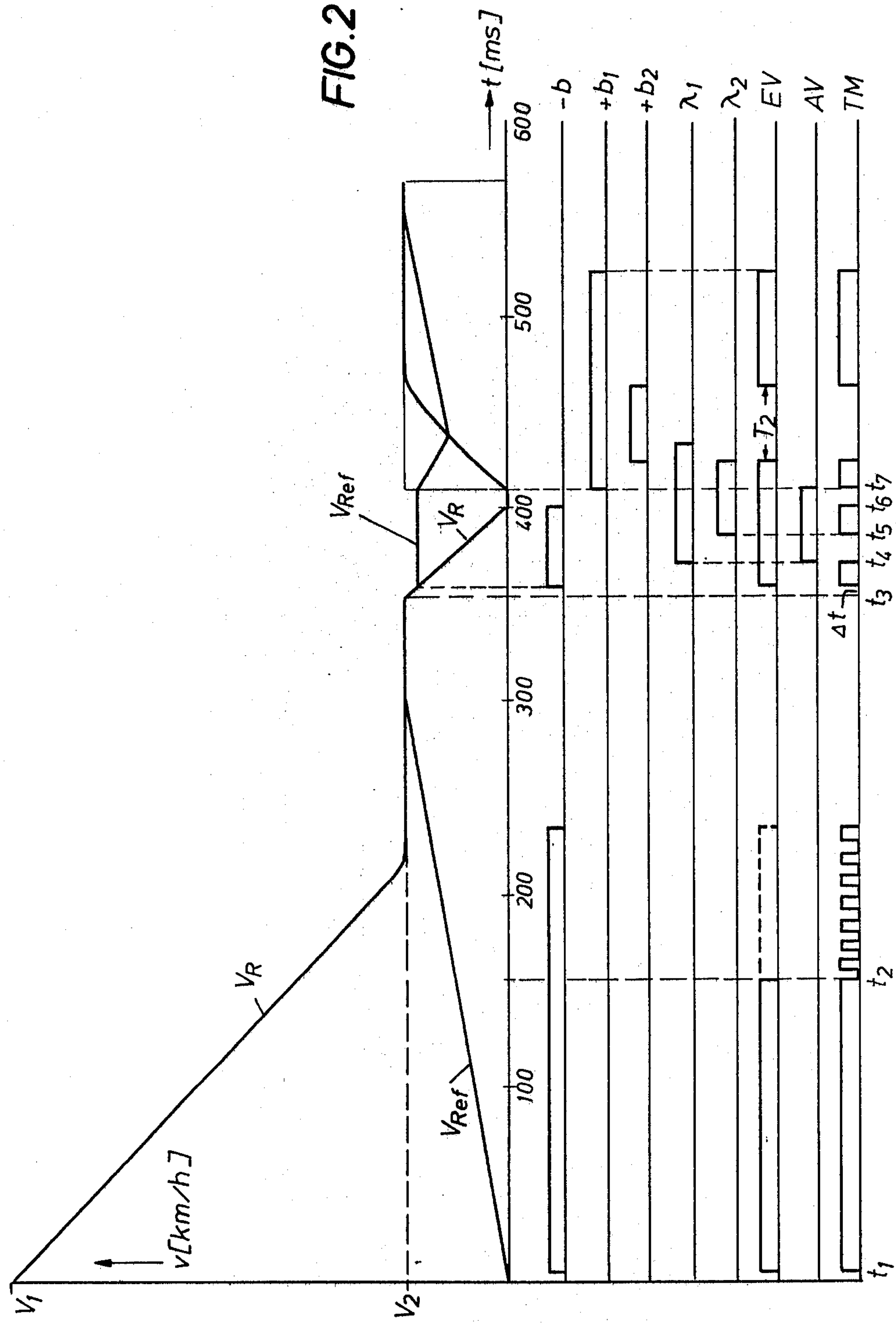
FIG. 2 is a time diagram to explain the circuit of FIG. 1.

Due to the shape of the curve for the wheel speed $V_R$, a deceleration signal ($-b$ signal) is produced until the speed $V_R$ has been adapted to the speed $V_2$ given by the input signal, i.e., at moment $t_1$, as shown in the corresponding line of FIG. 2. This signal causes the inlet valve 14 or 24 in the pressure controller to respond (see line EV). However, as shown in line EV at time $t_2$ the control signal for the inlet valve 14 or 24 drops, and the valve is closed, since for safety reasons the controller will not permit a response of the inlet valve 14 or 24 which is longer than the time period $T_1 = (t_2 - t_1)$.

At time $t_3$ the frequency of the input test signal is changed so that it corresponds to the wheel speed 0. This causes the filtered wheel speed $V_R$ to drop at a given rate. After a time $\Delta_t$ after time $t_3$, which corresponds to a certain reduction in speed, a deceleration signal $-b$ is again produced which causes inlet valve 14 or 24, respectively, to respond (line EV). At time $t_4$ the first slip threshold $\lambda_1$ has been exceeded and a corresponding signal ($\lambda_1$ — line) is produced which causes outlet valve 15 or 25 (line AV) to respond. A short time later at time $t_5$ the second slip threshold $\lambda_2$ is also exceeded and a $\lambda_2$ slip signal is generated. At time $t_6$ the wheel speed has adapted itself to the starting value where it remains constant until at time $t_7$ the frequency of the input test signal is again advanced to correspond to a speed $V_2$ so that $V_R$ increases and tries to adapt itself to the value $V_{Ref}$ of the speed $V_R$. Together with the rise in speed at $+b_1$ acceleration signal is generated followed with some delay by a $+b_2$ acceleration signal. The $+b_1$ signal produces the end of the pressure reduction stage by closing the outlet valve 15 or 25 (line AV) and the $+b_2$ signal causes the inlet valve (14 or 24, respectively) to open for a time duration $T_2$ (line EV).

According to the present invention, the signals from both control units to be monitored are tested for simultaneous occurrence. This is done so that a pulse sequence is generated which characterizes these signals and then the two resulting pulse sequences are compared with one another. These pulse sequences are generated in the logic networks 16 or 26, respectively, in which the signals $-b$, $\lambda_2$, EV and AV are linked according to the following equation:

$$TM = [EV \oplus AV] \oplus (-b) \cdot (\lambda_2)$$

In network 26 the gates required for this purpose are shown, i.e., an Exclusive-OR gate 1 having its two inputs connected to receive the EV and AV signals and its output connected to one input of an Exclusive-OR gate 2 whose other input is connected to the output of an AND gate 3, which links the $-b$ and $\lambda_2$ signals. At the output of Exclusive-OR gate 2 there appears the signal sequence shown in line TM of FIG. 2. This signal sequence and the corresponding sequence from member 16 are fed to comparator 4 which compares same and switches relay 5 if deviations occur between the signal sequences TM being compared. Relay 5, when switched, and by means of circuitry (not shown) controlled thereby, causes the antilocking control system to be switched off and/or a warning indication to be produced, preferably by allowing a warning indication turned on at the beginning of the test to remain on.

If the antilocking control system is provided, in a manner well known in the art, with a monitoring or safety circuit to prevent the pressure control valves, e.g., 14 and 15, from responding for too long a period of time, it may also be necessary to test this monitoring or safety circuit of the controller in that the response of the timing members of this safety circuit are monitored. In the safety circuit, the timing members emit a signal if, for example, a valve has been actuated longer than the time constant of the time members. In the embodiment of FIG. 1 it is assumed that the test of this safety or monitoring circuit is to take place before the other operational test described above and accordingly the signal generator 30 initially produces a test signal for this purpose. Preferably the frequency of this test signal is substantially higher than the frequencies generated during normal operation of the system. In the embodiment of FIG. 1, the timing members of the safety or monitoring circuit for the control unit 20–24 are assumed to be included in block 6 which receives its actuating signal from signal generator 30. At the same time, the test signal from signal generator 30 is fed to the testing time members 8 in block 7 to trigger same. The outputs from the timing members in block 6 and the timing members 8 are compared in a comparator 9 and if approximate coincidence of the time members is noted, a signal is fed to signal generator 30 to cause same to initiate the operational test for the control units 10–15 and 20–25. Alternatively, if separate safety or monitoring circuits are provided for each of the two control units, the outputs of the corresponding time members for each of the two control units can be compared.

In the embodiment of FIG. 1, each control unit is responsive to the rotational behavior of only one wheel of the vehicle, i.e., only one sensor, and controls the brake pressure at only the associated wheel brake. Often however, the control units or units of an antilock control system are responsive to the rotational behavior of a pair of wheels, e.g., a front wheel and a rear wheel, and processes these signals to provide control signals for the pressure control valves associated with these two wheels. FIG. 3 shows only one such control unit of an antilock control system. The control of the brake pressure of at least two wheel brakes dependent of the signals of at least two sensors is known for example from U.S. Pat. No. 3,909,077 issued Sept. 30th, 1975 to Leiber et al. and British Pat. No. 1,378,347. Here only one brake pressure control means is provided.

In FIG. 3, blocks 10' to 15' of the control unit correspond for example, to blocks 10–15 of FIG. 1. Since this control unit must also regulate the brake pressure of a second wheel brake, a second control channel for the control unit, including an additional sensor 40 for measuring the rotational behavior of the second wheel, transducer 41, signal processor 42, and additionally inlet valve 44, and outlet valve 45 is provided. The manner in which an output signal, which can be compared with a corresponding output signal from a further such control unit in the manner described with regard to FIG. 1, can be generated from the corresponding signals of the two control channels of the control unit is shown in an example of the deceleration signals $-b_v$ and $-b_h$ for the two wheels associated with the sensors 10' and 40. As shown the two deceleration signals $-b_v$ and $-b_h$ are combined or scanned via two gates 46 which are alternatingly actuated via a signal of alternating polarity applied at terminal 48. A $-b$ signal, which alternatingly corresponds to the $-b_v$ and $-b_h$ signals is then available at terminal 47 which can then be processed in the same manner as the $-b$ signal of FIG. 1, e.g., by comparing same to a corresponding $-b$ signal from a second control unit of the antilock control system. Correspondingly further signals from both control channels of the individual control unit shown in FIG. 3 may also be combined in the manner described for the $-b$ signals.

If it is assumed that the deceleration signals $-b_v$ and $-b_h$ of both channels of the control unit of FIG. 3 have the same length, but their effect on the inlet valve 44 of the rear wheel is not blocked after 150 msec as described above with respect to FIG. 2, the signal controlling the inlet valve 44 associated with the rear wheel will have a signal duration which extends far beyond time $t_2$. That is, as shown in FIG. 2, signal EV for the inlet valve 44 will include the dashed portion which extends beyond time $t_2$. By multiplexing the two EV signals for the inlet valves 14' and 44, e.g. by means of the gate arrangement shown in FIG. 3, there then results the pulse-shaped curve shown in line TM of FIG. 2 from time $t_2$ until the end of the dashed pulse in line EV of FIG. 2.

In the above example of the invention, a signal associated with a front wheel was compared with a signal associated with a front wheel and a signal associated with a rear wheel was compared with a signal associated with a rear wheel, the distribution of the wheels being either diagonal or lateral. It is also possible, however, to compare signals of control units each associated with the wheels of an axle of the vehicle (where one axle can also be controlled by means of a single sensor at the differential of this axle). In this case the present invention can also be used as long as the control units whose signals are being compared are of the same design.

Figure 4:
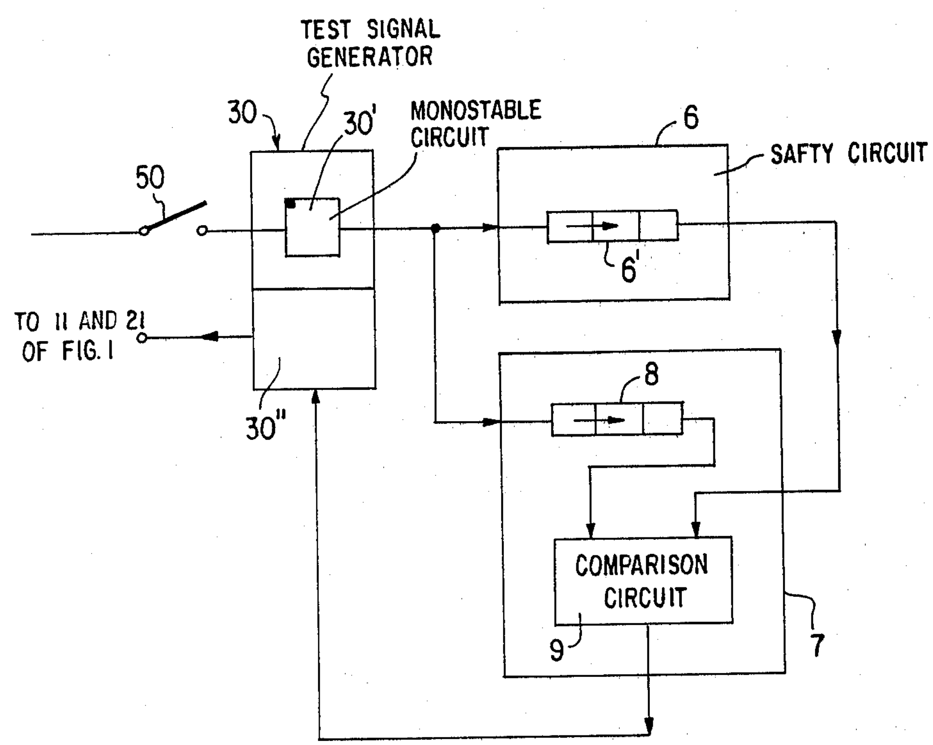
FIG. 4 shows the block 30 of FIG. 1 in more detail including also the connections to and from blocks 6 and 7.

In FIG. 4 the signal generating block 30 is illustrated in more detail together with parts of the blocks 6 and 8 of FIG. 1. For example, together with the ignition switch (not illustrated) the switch 50 of FIG. 4 is closed and thus monostable circuit 30' of block 30 is set for a given time period. The output signal of this circuit 30' then generated is fed to the timing member 6' of the safety circuit 6, which emits a signal if the signal fed to its input is longer than its time constant. The signal fed to the input of timing member 6' is also fed to the input of the a second time member 8 which has the same time constant. Thus if the time members are both in order, they generate output signals at the same time which are fed to the comparison circuit 9. The comparison circuit 9 then generates an output signal, which is fed to the block 30'' of block 30. The block 30'' may be dimensioned according to the principles known from the U.S. Pat. No. 3,907,380. The output signal of block 30'' which corresponds to a given wheel velocity curve is applied to the inputs of blocks 11 and 21 of FIG. 1.

To use and how to use a timing member such as 6' in a safety circuit 6 is known for example from U.S. Pat. No. 3,883,184 issued May 13, 1975 to Jonner et al.

It will be understood that the above description of the present invention is susceptible to various modifications, changes and adaptations, and the same are intended to be comprehended within the meaning and range of equivalents of the appended claims.

What is claimed is:

1. In an antilocking control system for wheel brakes of a vehicle, said system including two identically designed antilock control units for various wheels of the vehicle with each said control unit comprising at least one sensor for providing an output signal indicative of the rotational behavior of an associated vehicle wheel, an evaluation circuit means responsive to the output signal from said sensor for providing output control signals, and a brake pressure control means responsive to the output control signals from said evaluation circuit means for varying the brake pressure at the wheel brake of the associated wheel to prevent locking of same; and test circuit means for testing the operability of said antilocking control system at certain time intervals; the improvement wherein said test circuit means comprises: signal generating means responsive to a start instruction for simultaneously feeding at least one identical test signal to each of said two antilock control units; and interrogation and testing means for determining the effect of said test signal on each of said two antilock control units by comparing output signals from given corresponding points in each of said antilock control units for at least approximate coincidence with respect to the timely occurrence and/or magnitude of an output signal and for generating an output control signal if there is a deviation between the two signals being compared which is greater than a given value, whereby said output control signal from said interrogation and testing means may be used to switch off said antilocking control system and/or provide a warning indication, said interrogation and testing means including a separate logic circuit associated with each of said control units for linking the signals generated at various points of the associated control unit as a result of the input test signal in a manner so that a sequence of logic "O" and "L" signals is produced, the presence of which at a given point in time after feeding in the input signal is characteristic for the creation and/or disappearance of certain signals in the various points of said control units, and a comparison circuit means for comparing the two signal sequences generated by said logic circuits for coincidence.

2. An antilocking control system as defined in claim 1 wherein said two control units each include threshold value circuits for providing control signals for the wheel deceleration, the wheel acceleration and the wheel slip for at least one vehicle wheel, wherein said test signal produced by said signal generating means and fed to the control units is dimensioned so that output signals are produced in succession at the outputs of the individual threshold circuits of each of said control units; and wherein said interrogation and testing means are connected with said outputs of said threshold circuits to test for the possible simultaneous occurrence of corresponding output signals.

3. An antilocking control system as defined in claim 1 wherein each said pressure control means includes at least one valve for varying the wheel brake pressure; wherein said test signal fed to said two control units is dimensioned to cause said evaluation circuit means of said two control units to produce respective output control signals for actuating the associated ones of said valves; and wherein said interrogation and testing means are responsive to said output control signals for said valves so as to provide a test for the simultaneous occurrence of said output control signals for said valves.

4. An antilocking control system as defined in claim 1 wherein said signal generating means produces a test signal which has at least one portion whose value corresponds to a given wheel speed, one portion whose value corresponds to a reduction in wheel speed and one portion whose value corresponds to an increase in wheel speed.

5. An antilocking control system as defined in claim 1 wherein: each said brake pressure control means includes at least one inlet valve and one outlet valve each connected to a respective first and second output of the associated said evaluation circuit means; each said evaluation circuit means includes means for generating a deceleration signal when a given wheel deceleration is exceeded and a wheel slip signal when a given slip value is exceeded; and each said logic circuit includes a first Exclusive-OR gate having its two inputs connected to said first and second outputs, respectively, of the associated evaluation circuit means, an AND gate having two inputs, means for feeding said deceleration and slip signals to said two inputs of said AND gate, and a second Exclusive-OR gate having two inputs connected respectively to the outputs of said first Exclusive-OR gate and said AND gate, the output of said second Exclusive-OR gate being connected to said comparison circuit means.

6. An antilocking control system as defined in claim 1 wherein said antilocking control system further comprises an additional monitoring circuit, including timing members, for switching off the associated said control unit when certain circuit members in said evaluation circuit means respond for too long a period of time; wherein said signal generating means further includes means for generating further test signals for actuating said timing members provided in said monitoring circuit means; and wherein further testing means are provided for determining whether said further test signals cause the time constants of said timing members to expire within given periods of time.

7. An antilocking control system as defined in claim 1 wherein each of said control units contains two control channels for separately regulating the brake pressure at two different wheels of the vehicle; and wherein means are provided for each said control unit for rapidly and alternatingly scanning corresponding signals in each of said control channels to provide a combined signal containing alternating components of the signals from the two channels, said combined signal being fed to said interrogation and testing means for comparison purposes.

8. In an antilocking control system for wheel brakes of a vehicle, said system including two identically designed antilock control units for various wheels of the vehicle with each said control unit comprising at least one sensor for providing an output signal indicative of the rotational behavior of an associated vehicle wheel, an evaluation circuit means responsive to the output signal from said sensor for providing output control signals, and a brake pressure control means responsive to the output control signals from said evaluation circuit means for varying the brake pressure at the wheel brake of the associated wheel to prevent locking of same; and test circuit means for testing the operability of said antilocking control system at certain time intervals; the improvement wherein: said test circuit means includes signal generating means responsive to a start instruction for simultaneously feeding at least one identical test signal to each of said two antilock control units, and interrogation and testing means for determining the effect of said test signal on each of said two antilock control units by comparing output signals from given corresponding points in each of said antilock control units for at least approximate coincidence with respect to the timely occurrence and/or magnitude of an output signal and for generating an output control signal if there is a deviation between the two signals being compared which is greater than a given value, whereby, said output control signal from said interrogation and testing means may be used to switch off said antilocking control system and/or provide a warning indication; said antilocking control system further comprises an additional monitoring circuit, including timing members, for switching off the associated said control unit when certain circuit members in said evaluation circuit means respond for too long a period of time; said signal generating means further includes means for generating further test signals for actuating said timing members provided in said monitoring circuit means; and further testing means are provided for determining whether said further test signals cause the time constants of said timing members to expire within given periods of time.

9. An antilocking control system as defined in claim 8 wherein said timing members are digitally designed members which are charged with pulse sequences; and wherein said signal generating means is a pulse generator which produces said further test signals at a frequency for the pulse sequence which is very much higher than the frequencies used during normal operation of said antilocking control system.

10. In an antilocking control system for wheel brakes of a vehicle, said system including two identically designed antilock control units for various wheels of the vehicle with each said control unit comprising at least one sensor for providing an output signal indicative of the rotational behavior of an associated vehicle wheel, an evaluation circuit means responsive to the output signal from said sensor for providing output control signals, and a brake pressure control means responsive to the output control signals from said evaluation circuit means for varying the brake pressure at the wheel brake of the associated wheel to prevent locking of same; and test circuit means for testing the operability of said antilocking control system at certain time intervals; the improvement wherein: said test circuit means includes signal generating means responsive to a start instruction for simultaneously feeding at least one identical test signal to each of said two antilock control units, and interrogation and testing means for determining the effect of said test signal on each of said two antilock control units by comparing output signals from given corresponding points in each of said antilock control units for at least approximate coincidence with respect to the timely occurrence and/or magnitude of an output signal and for generating an output control signal if there is a deviation between the two signals being compared which is greater than a given value, whereby, said output control signal from said interrogation and testing means may be used to switch off said antilocking control system and/or provide a warning indication; each of said control units contains two control channels for separately regulating the brake pressure at two different wheels of the vehicle; and means are provided for each said control unit for rapidly and alternatingly scanning corresponding signals in each of said control channels to provide a combined signal containing alternating components of the signals from the two channels, said combined signal being fed to said interrogation and testing means for comparison purposes.

* * * * *